United States Patent [19]

Swiatosz

[11] 4,303,397
[45] Dec. 1, 1981

[54] SMOKE GENERATING APPARATUS

[75] Inventor: Edmund Swiatosz, Maitland, Fla.

[73] Assignee: The United States of America as represented by the Secretary of the Navy, Washington, D.C.

[21] Appl. No.: 176,426

[22] Filed: Aug. 8, 1980

[51] Int. Cl.³ .............................................. B01J 13/00
[52] U.S. Cl. ........................................ 434/226; 46/9; 252/359 R; 272/15
[58] Field of Search ...................... 434/226, 16; 46/9; 272/15, 20; 252/359 R, 359 A, 359 B; 114/15; 116/214; 126/59.5

[56] References Cited

U.S. PATENT DOCUMENTS

| Re. 26,563 | 4/1969 | Seuthe | 46/9 |
|---|---|---|---|
| 1,683,760 | 9/1928 | Conners | 46/9 X |
| 2,311,199 | 2/1943 | Astradsson | 252/359 R |
| 2,324,359 | 7/1943 | Callan | 46/9 |
| 2,850,615 | 9/1958 | Luse, Jr. et al. | 252/359 A |
| 2,882,240 | 4/1959 | Charwat | 252/359 A |
| 3,249,553 | 5/1966 | Steinberg | 252/359 A |
| 3,250,723 | 5/1966 | Fortney | 252/359 A X |
| 3,272,510 | 9/1966 | Ohlund et al. | 434/16 X |
| 3,432,439 | 3/1969 | Dickman | 252/359 A |
| 3,573,223 | 3/1971 | Anderson | 252/359 A |

Primary Examiner—William H. Grieb
Attorney, Agent, or Firm—Richard S. Sciascia; Robert W. Adams; David S. Kalmbaugh

[57] ABSTRACT

A smoke generating apparatus is disclosed for providing a nontoxic smoke so as to simulate the smoke of a fire. The smoke generating apparatus comprises a storage tank, a smoke producing agent stored in the storage tank, and a housing affixed to the top of the storage tank. A centrifugal pump supplies the smoke producing agent to a tubular coil which superheats the smoke producing agent. The superheated smoke producing agent is then released through a solenoid valve into the atmosphere so as to form a vapor.

15 Claims, 3 Drawing Figures

SMOKE GENERATING APPARATUS

BACKGROUND OF THE INVENTION

1. Field of the Invention

This invention relates generally to training devices. In particular, this invention relates to a training device for simulating the smoke of a fire.

2. History of the Prior Art

A wide variety of training devices are available for generating nontoxic smoke so as to teach a student, under realistic conditions, how to handle a fire. One such device of the prior art simulates smoke by utilizing steam admixed with an organic liquid so as to produce a vaporized organic liquid, and forcing the vaporized organic liquid through a narrow orifice into the atmosphere so that the vapor is rapidly chilled. While performing satisfactorily for its intended purpose of generating smoke, this device of the prior art ordinarily leaves something to be desired, especially from the standpoints of energy utilization efficiency, design complexity, and smoke producing capacity.

In addition, there are commercially available a variety of foggers which generate smoke. Heat transfer to vaporize the smoke producing agent utilized therein is generally provided by propane heaters, gasoline engines, or electric heater coils. While working quite well for their intended purpose of producing smoke, these devices of the prior art ordinarily leave something to be desired from the standpoints of smoke producing capacity and energy utilization efficiency.

SUMMARY OF THE INVENTION

The subject invention overcomes some of the disadvantages of the prior art, including those mentioned above, in that it comprises a relatively simple smoke generating apparatus which produces a nontoxic smoke.

Included in the subject invention is a storage tank having stored therein a smoke producing agent utilized by the subject invention, a base support member mounted upon the top surface of the storage tank, and a housing fixedly attached to the base support member.

Mounted within the aforementioned housing is a tubular coil which superheats the smoke producing agent to a predetermined temperature such that when an operator activates a push button switch which in turn activates a solenoid valve affixed to the housing, the smoke producing agent will pass through the solenoid valve into the atmosphere so as to form a vapor, and thereby simulate the smoke of a fire.

The subject invention further includes the capability of preventing the activation of the solenoid valve by the operator until the smoke producing agent is superheated to the aforementioned predetermined temperature. Incorporated therein for such a purpose is a temperature probe which continuously monitors the temperature of the tubular coil, and is connected in a unique combination with a temperature controller, a relay solenoid, and a pair of relay switches.

DESCRIPTION OF THE PREFERRED EMBODIMENT

Figure 1:
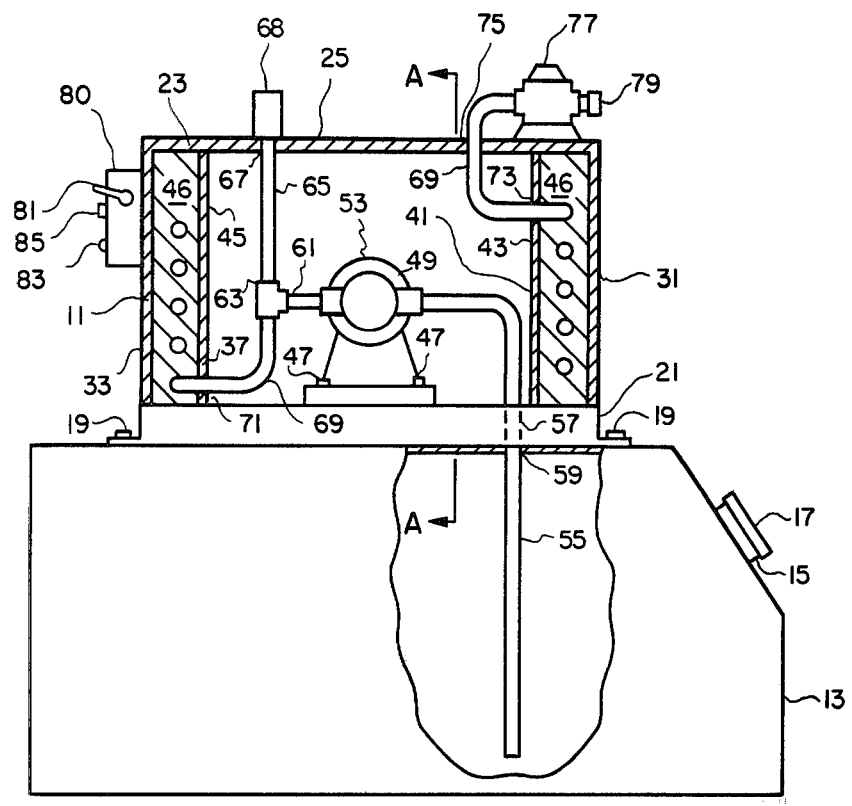
FIG. 1 is a cross sectional side view of the smoke generating apparatus constituting the subject invention.

The preferred embodiment of the subject invention will now be discussed in detail in conjunction with all of the figures of the drawing wherein like parts are designated by like numerals insofar as it is possible and practical to do so.

Figure 2:
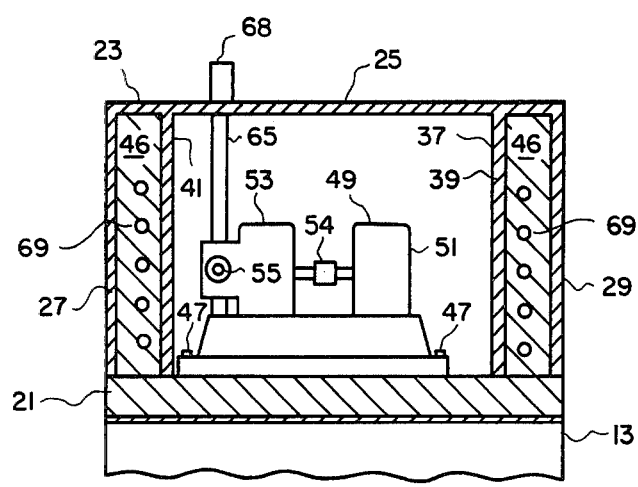
FIG. 2 is a cross sectional front view of the apparatus of FIG. 1, with the section disclosed having been taken at Section A—A thereof.

Referring now to FIGS. 1 and 2, there is shown a smoke generating apparatus 11 which comprises a storage tank 13 having stored therein a nontoxic smoke generating liquid such as, for example, propylene glycol, polyethylene glycol 200, or mineral oil. Storage tank 13 is provided with a filler tube 15 which normally is closed with a removable cap 17.

Mounted on the top of storage tank 13 and secured thereto as by a plurality of bolts 19 is a base support member 21. Fixedly attached to base support member 21 as by a plurality of bolts, not shown, is a housing 23. Housing 23 includes a top wall 25, side walls 27 and 29, a front wall 31, and a rear wall 33.

Located within housing 23 and secured to top wall 25 of housing 23, as by a weld, is a rectangular shaped inner shell 37. Inner shell 37 includes a pair of side walls 39 and 41, a front wall 43, and a rear wall 45. Located between housing 23 and inner shell 37 is a layer of heat resistant insulation material 46 which may be, for example, ceramic foam.

Mounted upon base support member 21 as by a plurality of bolts 47 is a pumping apparatus 49. Pumping apparatus 49 includes a drive motor 51, the shaft of which is connected to the shaft of a centrifugal pump 53 by a coupling 54, and may be, for example, a model RP-G400-2 pump manufactured by Fluid Metering, Inc. of Oyster Bay, N.Y.

Connected to the inlet port of centrifugal pump 53 is one end of an intake pipe 55, the opposite end of which passes through a pair of aligned apertures 57 and 59 to near the bottom of storage tank 13.

Connected to the discharge port of centrifugal pump 53 is one end of a pipe 61, the opposite end of which is connected to the inlet of a tee fitting 63. Connected to the first outlet of tee fitting 63 is one end of a pipe 65, the opposite end of which passes through an aperture 67 within top wall 25 of housing 23 and is connected to the inlet of a relief valve 68. Relief valve 68 may be a model 4662K12 relief valve manufactured by McMaster-Carr, Inc. of Chicago, Ill.

Connected to the second outlet of tee fitting 63 is one end of a tubular coil 69, which may be fabricated from any highly electrical resistant metal alloy such as stainless steel. Tubular coil 69 then passes through an aperture 71 located within rear wall 45 of inner shell 37, winds around the periphery of inner shell 37, passes through an aperture 73 located within front wall 43 of inner shell 37, and an aperture 75 located within top wall 25 of housing 23, and is connected at the opposite end thereof to the inlet port of a solenoid valve 77. Solenoid valve 77 is mounted upon top wall 25 of housing 23, and may be, for example, a model 4783R16 solenoid valve supplied by McMaster-Carr.

Connected to the discharge port of solenoid valve 77 is an orifice 79 which may be, for example, a model N1055 needle valve manufactured by Deltro Fluid Products of Bellwood, IL.

Mounted on rear wall 33 of housing 23 is an electrical control box 80 which includes a normally open switch 81, an indicator light 83, and a normally open push button switch 85. In addition, electrical control box 80 has mounted therein the electrical control elements illustrated in the schematic diagram of FIG. 3.

Figure 3:
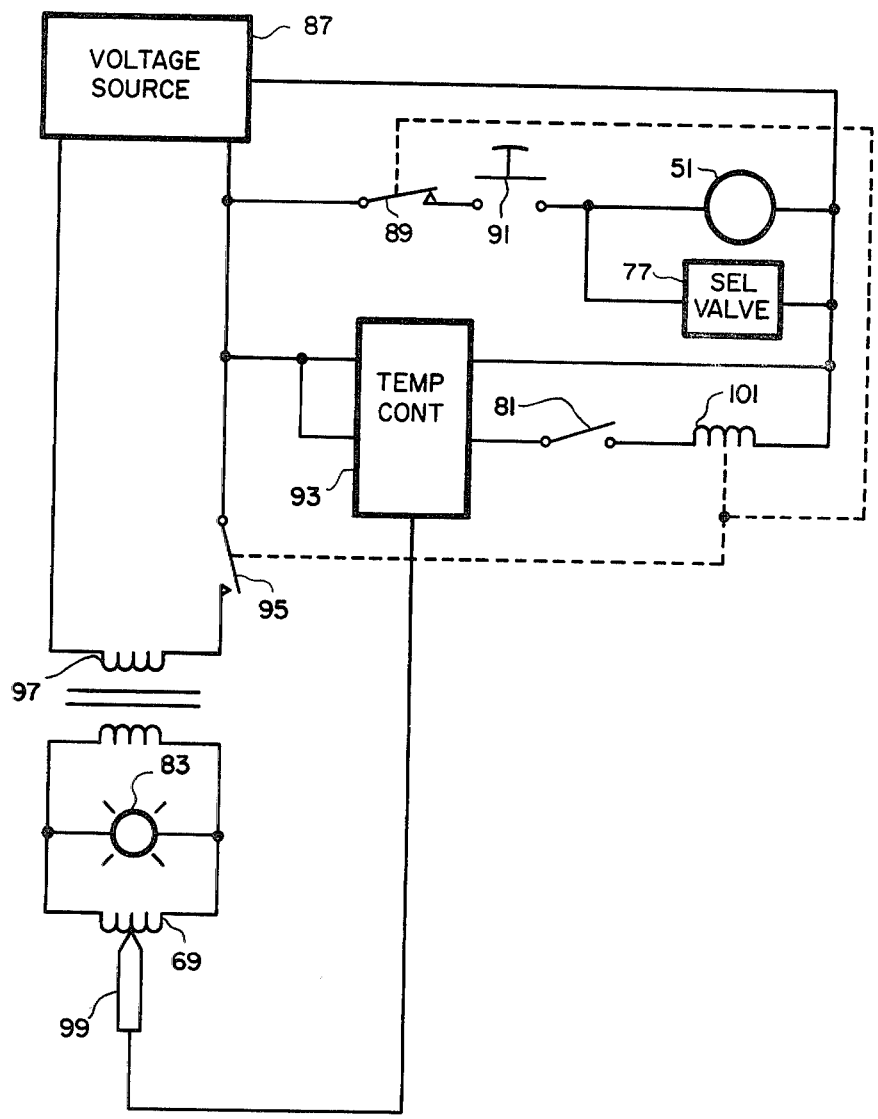
FIG. 3 is a schematic diagram of the electrical components utilized in the invention of FIG. 1.

Referring now to FIG. 3, there is shown an alternating current voltage source 87, which has first and second line terminals, and a neutral terminal. Alternating current voltage source 87 may be, for example, a polyphase circuit which provides between the first line and the neutral terminals thereof a first alternating current signal, and between the first and second line terminals thereof a second alternating current signal.

Connected to the first line terminal of alternating current voltage source 87 is the input of a normally closed relay switch 89, the output of which is connected to the input of a normally open push button switch 91, with the output thereof connected to the inputs of drive motor 51, and solenoid valve 77. The outputs of drive motor 51 and solenoid valve 77 are, in turn, connected to the neutral terminal of alternating current voltage source 87.

In addition, the first line terminal of alternating current voltage source 87 is connected to the first and second inputs of a temperature controller 93, and the input of a normally open relay switch 95. The output of relay switch 95 is, in turn, connected to the first terminal of a voltage step down transformer 97, the second terminal of which is connected to the second line terminal of voltage source 87. The third terminal of transformer 97 is connected to the first terminal of tubular coil 69, the second terminal of which is connected to the fourth terminal of transformer 97. Connected between the third and fourth terminals of transformer 97 is indicator light 83 which, as mentioned above, is mounted upon electrical control box 80, FIG. 1.

At this time, it may be noteworthy to mention that temperature controller 93 may be, for example, a model R7380 temperature controller manufactured by Honeywell, Inc.

Affixed to tubular coil 69 is a temperature probe 99, the output of which is connected to the third input of temperature controller 93.

The first output of temperature controller 93 is connected to the neutral terminal of alternating current voltage source 87. The second output of temperature controller 93 is connected to the input of normally open switch 81, the output of which is connected to the input of a relay solenoid 101, with the output thereof connected to the neutral input of voltage source 87.

The mechanical actuation output of relay solenoid 101 is, in turn, connected to the mechanical actuation inputs of normally closed relay switch 89 and normally open relay switch 95.

The operation of the subject invention will now be discussed in detail in conjunction with all of the figures of the drawing.

For the following discussion, it may be assumed that propylene glycol is the smoke producing agent utilized within the subject invention although, as discussed previously, other smoke producing agents, such as polyethylene glycol 200, or mineral oil, may be utilized as the smoke producing agent within the subject invention. In addition, it may be noted that switch 81, FIG. 3, is normally closed when utilizing the subject invention. Further, it may be noted that temperature controller 93, FIG. 3, is preset at an operating temperature of 420° F. such that whenever the temperature of tubular coil 69, FIG. 3, exceeds 420° F., temperature controller 93, FIG. 3, will not allow any signal supplied to the second input thereof to pass therethrough.

Referring now to FIGS. 1, 2, and 3, alternating current voltage source 87, as mentioned above, provides first and second alternating current signals, the first of which has a voltage level of approximately 120 volts, and the second of which has a voltage level of approximately 240 volts.

Whenever the temperature of coil 69 is less than 420° F., the first alternating current signal provided by voltage source 87 activates temperature controller 93 so as to allow the aforementioned first alternating current signal to pass through temperature controller 93 and switch 81 to the input of solenoid relay 101. This, in turn, energizes solenoid relay 101 so as to open relay switch 89, and closes relay switch 95.

The second alternating current signal provided by voltage source 87 will then pass through relay switch 95 to transformer 97, which steps down the voltage level of the aforementioned second alternating current signal to a more suitable voltage level of approximately forty-eight volts. This, in turn, allows the second alternating current signal to pass through tubular coil 69 so as to heat the aforementioned coil to a temperature of 420° F., thereby superheating the propylene glycol therein. In addition, the second alternating current signal will pass through indicator light 83 so as to energize indicator light 83 and thereby indicate to an operator, not shown, that the propylene glycol within coil 69 is being superheated.

Temperature probe 99, which continuously monitors the temperature of tubular coil 69, provides at the output thereof an analog signal proportional to the temperature of tubular coil 69.

Whenever the temperature of tubular coil 69 exceeds the aforementioned temperature of 420° F., controller 87, as mentioned above, will prevent the first alternating current signal provided by voltage source 87 from passing through controller 93, thus de-energizing relay solenoid 101.

This, in turn, closes relay switch 89 so as to allow for the activation of drive motor 51, and solenoid valve 77, and opens relay switch 95 so as to prevent the propylene glycol within tubular coil 69 from being superheated substantially above 420° F. In addition, it may be noteworthy to mention that the pressure of the propylene glycol within tubular coil 69, when superheated, is approximately forty pounds per square inch.

At this time, it may be noteworthy to mention that relief valve 68 is preset to release the propylene glycol into the atmosphere whenever the pressure within the tubular coil 69 exceeds one hundred pounds per square inch. This, in turn, prevents the aforementioned operator, not shown, from being injured, should the pressure within tubular 69 exceed one hundred pounds per square inch.

When the temperature of the propylene glycol reaches 420° F., indicator light 83 will become de-energized, thus indicating to the operator, not shown, that smoke generating apparatus 11 may be utilized to generate nontoxic smoke. The aforementioned operator may then close push button switch 91 which, in turn, activates solenoid valve 77 so as to allow the superheated propylene glycol to pass through solenoid valve 77 and orifice 79 into the atmosphere as a vapor. In addition, closure of push button switch 91 activates drive motor 51 which drives centrifugal pump 53. Centrifugal pump 53 then feeds the propylene glycol stored within storage tank 13 to tubular coil 69.

When the temperature of tubular coil 69 drops below 420° F., temperature controller 93 will allow the first alternating current signal provided by voltage source 87 to pass through temperature controller 93 so as to energize solenoid coil 101, thus preventing the propylene glycol within coil 69 from passing through solenoid valve 77, and at the same time super-heating the propylene glycol within coil 69.

While propylene glycol is the preferred smoke producing agent to be utilized by smoke generating apparatus 11, it is contemplated that other liquids, such as polyethylene glycol 200 or mineral oil, may be employed as the smoke producing agent for the subject invention. The utilization of a variety of smoke producing agents within the subject invention will require that the temperature and thus the heat transfer rate of tubular coil 69 be either increased or decreased, depending upon the temperature required to superheat the smoke producing agent utilized by smoke generating apparatus 11. This, in turn, contemplates that the operating temperature of temperature controller 93 be adjusted so as to allow for the superheating of the particular smoke producing agent utilized by the subject invention.

In addition, it may be noteworthy to mention that smoke generating apparatus 11 will function without heat resistant insulation material 46. However, utilization of heat resistant insulation material within smoke generating apparatus 11 prevents minor heat loss from tubular coil 69. This, in turn, provides for an optimum heat transfer rate between tubular coil 69, and the smoke producing agent stored therein so as to increase the efficiency of the subject invention.

From the foregoing, it may readily be seen that the subject invention comprises a new, unique, and exceedingly useful smoke generating apparatus, which constitutes a considerable improvement over the known prior art. Obviously, many modifications and variations of the present invention are possible in light of the above teachings. It is, therefore, to be understood that within the scope of the appended claims the invention may be practiced otherwise than as specifically described.

What is claimed is:

1. A nontoxic smoke generating device comprising, in combination:
   a storage tank having an aperture extending through the top thereof and a smoke producing agent stored therein;
   a base support member mounted upon the top surface of said storage tank, said base support member having extended therethrough an aperture in alignment with the aperture of said storage tank;
   a housing fixedly attached to said base support member, and having a top wall;
   coil means mounted within said housing, and having first and second terminals for superheating said smoke producing agent to a predetermined temperature;
   pumping means mounted upon said base support member, said pumping means having an inlet passing through the aligned apertures of said base support member, and said storage tank, an outlet connected to one end of said coil means, an input, and an output for withdrawing said smoke producing agent from said storage tank so as to supply said smoke producing agent to said coil means;
   valve means mounted on the top wall of said housing, said valve means having an inlet connected to the other end of said coil means, an outlet, an input, and an output for releasing said superheated smoke producing agent into the atmosphere as a vapor;
   probe means affixed to said coil means and having an output for continuously monitoring the temperature of said coil means;
   normally open switching means having an input, and an output connected to the input of said pumping means and the input of said valve means adapted for activating said valve means, and said coil means whenever an operator closes said normally open switching means so as to effect the release of said superheated smoke producing agent into the atmosphere by said valve means, and the withdrawal of said smoke producing agent from said storage tank by said pumping means; and
   control circuit means having a first terminal connected to the first terminal of said coil means, a second terminal connected to the second terminal of said coil means, a third terminal connected to the input of said normally open switching means, a fourth terminal connected to the output of said pumping means and the output of said valve means, and a fifth terminal connected to the output of said probe means for providing an alternating current signal so as to effect the superheating of said smoke producing agent to the predetermined temperature by said coil means, and for inhibiting the activation of said coil means, and said pumping means by said normally open switching means whenever the temperature of said coil means is less than the predetermined temperature required to superheat said smoke producing agent.

2. The device of claim 1, wherein said smoke producing agent is propylene glycol.

3. The device of claim 1, wherein said smoke producing agent is polyethylene glycol 200.

4. The device of claim 1, wherein said smoke producing agent is mineral oil.

5. The device of claim 1, wherein said pumping means comprises:
   a centrifugal pump mounted upon said base support member, said centrifugal pump having an inlet port, a discharge port connected to one end of said coil means, and a shaft;
   an intake pipe having one end thereof connected to the intake port of said centrifugal pump, and the opposite end thereof passing through the aligned apertures of said base support member and said storage tank to near the bottom of said storage tank; and
   a drive motor having a shaft connected to the shaft of said centrifugal pump, an input connected to the output of said normally open switching means, and an output connected to the fourth terminal of said control circuit means.

6. The device of claim 1, wherein said valve means comprises:
   a solenoid valve mounted on the top wall of said housing, said solenoid valve having an inlet port connected to the other end of said coil means, a discharge port, an input connected to the output of said normally open switching means and an output connected to the fourth terminal of said control circuit means; and an orifice connected to the discharge port of said solenoid valve.

7. The device of claim 1, wherein said control circuit means comprises:

an alternating current voltage source having first, second, and third terminals, the first terminal of which is connected to the input of said normally open switching means, and the second terminal of which is connected to the output of said pumping means and the output of said valve means;

a temperature controller having first and second inputs connected to the first terminal of said alternating current voltage source, a third input connected to the output of said probe means, a first output connected to the second terminal of said alternating current voltage source, and a second output;

a normally open switch having an input connected to the second output of said temperature controller, and an output;

a relay solenoid having an input connected to the output of said normally open switch, an output connected to the second terminal of said alternating current voltage source, and a mechanical actuation output;

a normally closed relay switch having an input connected to the first terminal of said alternating current voltage source, an output connected to the input of said normally open switching means, and a mechanical actuation input connected to the mechanical actuation output of said relay solenoid;

a normally open relay switch having an input connected to the first terminal of said alternating current voltage source, an output, and a mechanical actuation input connected to the mechanical actuation output of said relay solenoid; and a voltage step down transformer having a first terminal connected to the output of said normally open relay switch, a second terminal connected to the third terminal of said alternating current voltage source, a third terminal connected to the first terminal of said coil means, and a fourth terminal connected to the second terminal of said coil means.

8. The device of claim 1, further characterized by a relief valve mounted on the top wall of said housing, said relief valve having an inlet effectively connected to the outlet of said pumping means.

9. A smoke generating apparatus comprising, in combination:

a storage tank having an aperture extending through the top thereof;

a liquid stored within said storage tank;

a base support member mounted upon the top surface of said storage tank, said base support member having extended therethrough an aperture in alignment with the aperture of said storage tank;

a housing fixedly attached to said base support member, said housing having a top wall;

an aperture extending through the top wall of said housing;

a centrifugal pump mounted upon said base support member, said centrifugal pump having an inlet port, a discharge port, and a shaft;

an intake pipe having one end thereof connected to the inlet port of said centrifugal pump, with the opposite end thereof passing through the aligned apertures of said base support member and said storage tank to near the bottom of said storage tank;

a tubular coil mounted within said housing, said tubular coil having one end thereof connected to the discharge port of said centrifugal pump, the other end thereof passing through the first aperture of the top wall of said housing, and a pair of terminals, the first of which is located at one end of said tubular coil, and the second of which is located at the other end of said tubular coil;

a solenoid valve mounted on the top wall of said housing, said solenoid valve having an inlet port connected to the other end of said tubular coil, a discharge port, an input, and an output;

an orifice effectively connected to the discharge port of said solenoid valve;

an alternating current voltage source having first, second, and third terminals, the first terminal of which is connected to the output of said solenoid valve.

a temperature controller having first and second inputs connected to the second terminal of said alternating current voltage source, a third input, a first output connected to the first terminal of said alternating current voltage source, and a second output;

a temperature probe affixed to said tubular coil, said temperature probe having an output connected to the third input of said temperature controller;

a normally open switch having an input connected to the second output of said temperature controller, and an output;

a relay solenoid having an input connected to the output of said normally open switch, an output connected to the first terminal of said alternating current voltage source, and a mechanical actuation output;

a normally open relay switch having an input connected to the second terminal of said alternating current voltage source, a mechanical actuation input connected to the mechanical actuation output of said relay solenoid, and an output;

a normally closed relay switch having an input connected to the second terminal of said alternating current voltage source, a mechanical actuation input connected to the mechanical actuation output of said relay solenoid, and an output;

a normally open push button switch having an input connected to the output of said normally closed relay switch and an output connected to the input of said solenoid valve;

a drive motor having a shaft connected to the shaft of said centrifugal pump, an input connected to the output of said normally open push button switch and an output connected to the first terminal of said alternating current voltage source; and a voltage step down transformer having a first terminal connected to the output of said normally open relay switch, a second terminal connected to the third terminal of said alternating current voltage source, a third terminal connected to the first terminal of said tubular coil, and a fourth terminal connected to the second terminal of said tubular coil.

10. The smoke generating apparatus of claim 9, wherein said liquid is propylene glycol.

11. The smoke generating apparatus of claim 9, wherein said liquid is polyethylene glycol 200.

12. The smoke generating apparatus of claim 9, wherein said liquid is mineral oil;

13. The smoke generating apparatus of claim 9, further characterized by a relief valve mounted on the top wall of said housing, said relief valve having an inlet effectively connected to the discharge port of said centrifugal pump.

14. The smoke generating apparatus of claim 9, further characterized by an inner shell mounted within said housing, said inner shell having a pair of apertures extending therethrough such that one end of said tubular coil passes through the first of said pair of apertures, the opposite end of said tubular coil passes through the second of said pair of apertures, and the remainder of said tubular coil winds around the periphery of said inner shell.

15. The smoke generating apparatus of claim 9, further characterized by an indicator light connected between the third and fourth terminals of said voltage step down transformer.

* * * * *